Jan. 13, 1959

W. B. MITCHELL 2,868,997

SWITCHING CIRCUITS

Filed May 13, 1958

INVENTOR
WALTER BERT MITCHELL
BY H. Vincent Harsha
ATTORNEY

United States Patent Office 2,868,997

Patented Jan. 13, 1959

2,868,997

SWITCHING CIRCUITS

Walter Bert Mitchell, Natick, Mass., assignor to Raytheon Manufacturing Company, Waltham, Mass., a corporation of Delaware Application May 13, 1958, Serial No. 734,951

11 Claims. (Cl. 307—75)

Figure 1:
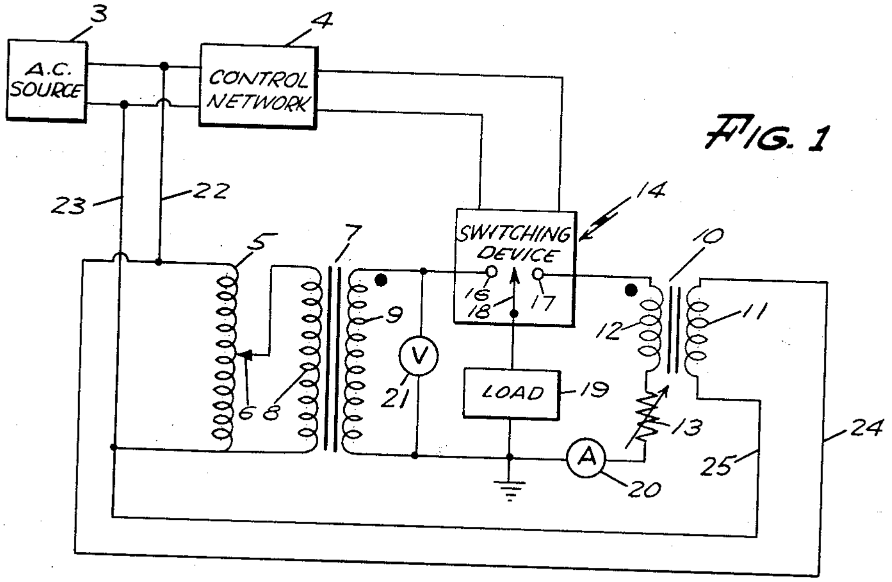

This invention relates generally to switching circuits and more particularly to circuits for alternately switching a high-current low-voltage supply, and a low-current high voltage supply, to a load.

It is often desirable to supply a load alternately from two different sources. For example, in life testing diode rectifiers it is necessary to apply alternately a low voltage in a direction to cause the diode to conduct with a high current, and a high-reverse voltage with essentially zero current through the diode. In this specification, it is to be understood that the terms high voltage or high current are used to denote large values of voltage or current and that the terms low voltage or low current are used to denote small values of voltage or current. In order to adjust the amount of high current through the diode under its forward-conducting condition, a variable resistance is required in the diode circuit. In prior circuits that have been used, a high alternating voltage is supplied to a series connection of the diode to be tested and a variable resistance. A large amount of power is thereby dissipated in the variable resistance during the forward-conducting portion of the cycle. In fact, the power dissipated in the resistor may be as much as one hundred times the power dissipated in the diode itself. Such dissipation of power represents a useless waste of energy and, hence, greatly increases the expense of operation of the test device. This invention, however, greatly reduces the amount of useless power dissipation by providing a switching circuit in which the useless power dissipation is considerably reduced to a point where it is of the same order of magnitude as the power dissipated in the diode.

Another disadvantage of prior testing circuits of this type has been that the adjustment of the reverse voltage in the diode cannot be made independently of the adjustment of the forward current through the diode. In this invention, however, such adjustments can be made completely independently.

Figure 2:
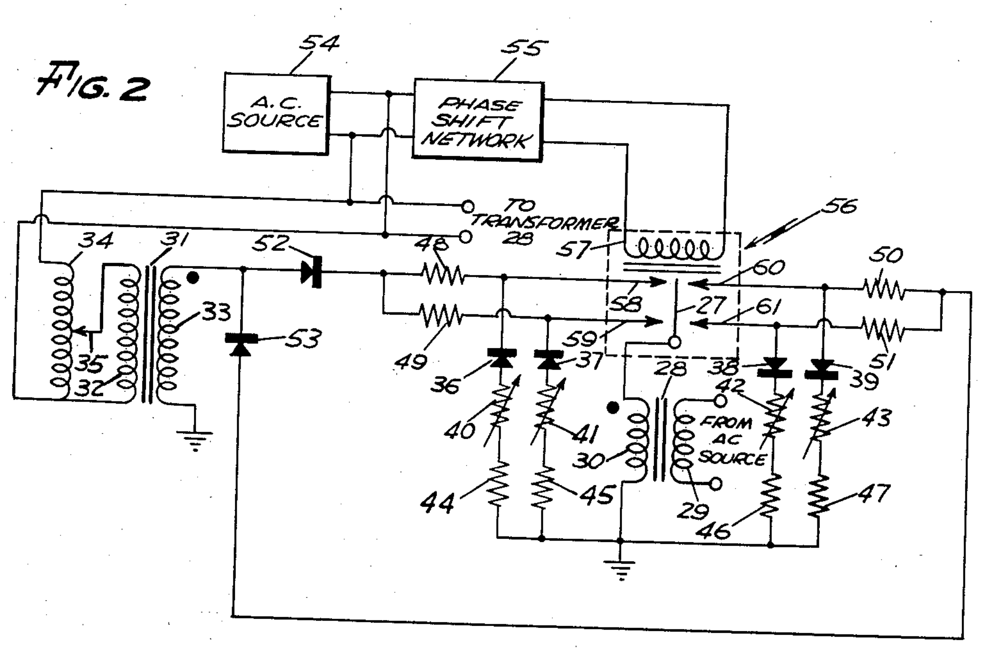

The invention can be best described with the help of the drawing in which:

Fig. 1 shows a particular embodiment of the invention in which a load is alternately supplied by a low-voltage high-current source and by a high-voltage low-current source; and Fig. 2 shows a particular embodiment of the invention for life testing a bank of diode rectifiers.

In Fig. 1, a switching device 14 is excited from an A.-C. source 3 through a control network 4. Switching device 14 is understood to represent any type of switching device capable of connecting either of two separate terminals from center terminal in response to a control signal from control network 4. Hence, switching device 14 is schematically represented in the figure as having two separate terminals 16 and 17 and a center terminal 18 which is connected to one side of a load 19. The other side of load 19 is connected to ground. Terminal 16 of device 14 is connected to one side of a secondary winding 9 of transformer 7. The other side of winding 9 is connected to ground. Primary 8 of transformer 7 has its high voltage side connected to variable arm 6 of a Variac 5. The Variac is excited by A.-C. source 3 through conducting leads 22 and 23. Transformer 7 is a commercially available type that supplies a high voltage at a low current.

Terminal 17 of device 14 is connected to one side of secondary winding 12 of transformer 10. The other side of secondary winding 12 is connected to one side of variable resistance 13, the other side of which is connected to ground through an ammeter 20. Primary winding 11 of transformer 10 is excited from A.-C. source 3 through conducting leads 24 and 25. Transformer 10 is a commercially available type that supplies a low voltage at a high current. A voltmeter 21 is connected across secondary winding 9 of transformer 7.

The operation of the circuit shown in Fig. 1 can be described as follows. The polarities of secondaries 9 and 12 of transformers 7 and 10, respectively, are connected so that the alternating positive and negative half cycles of the voltages on each of the secondaries are always in phase. Hence, the signals on outputs 9 and 12 always pass through zero coincidentally. Control network 4 is adjusted so that the center terminal 18 of device 14 is switched between the terminals 16 and 17 at the exact moments when the output signals on the secondaries 9 and 12 pass through zero. The control voltage fed to device 14 from control network 4 operates in conjunction with the voltages at the secondary windings 9 and 12 so that, when the output signals from secondaries 9 and 12 are positive, the center terminal 18 is connected to terminal 17 of the device 14. As the signals at the secondaries pass through zero from positive to negative, the center terminal switches and is connected to terminal 16 during the negative half of the cycle. Thus, during the positive half of the cycle, when terminal 17 is connected to center terminal 18, a low positive voltage is connected across load 19. The amount of current through that load is adjusted by varying the value of variable resistor 13. The value of this current can be read directly by means of ammeter 20. During the negative half of the cycle, terminal 16 is connected to center terminal 18, and a high negative, or reverse, voltage is applied across load 19. The value of this voltage may be adjusted by setting variable contact 6 of Variac 5. The value of this voltage may be read directly by means of voltmeter 21.

Fig. 2 shows another embodiment of the invention which is a device for life testing a group of diode rectifiers. In that figure the diode rectifiers to be tested are diodes 36, 37, 38 and 39. As in the circuit of Fig. 1, an A.-C. source 54 is connected to a switching device which, in this embodiment, is a relay 56. Coil 57 of relay 56 is connected to source 54 through a phase shift network 55. Relay 56 has four contacts 58, 59, 60, and 61 and a center contact 27. In this circuit, contact 58 is connected to the cathode of diode 36. The anode of diode 36 is connected to ground through a variable desistance 40 and a fixed resistance 44. Contact 59 is similarly connected to diode 37 and thence to ground through variable resistance 41 and fixed resistance 45. Contact 60 is connected to the anode of diode 39. The cathode of diode 39 is connected to ground through variable resistance 43 and fixed resistance 47. Contact 61 is similarly connected to diode 38 and thence to ground through variable resistance 42 and fixed resistance 46. Center contact 27 is connected to secondary winding 30 of transformer 28. The other side of secondary winding 30 is connected to ground. Primary winding 29 of transformer 28 is connected to A.-C. source 54. Transformer 28 is a commercially available type that supplies a low voltage at a high current. Contact 58 is also connected to one side of resistor 48 and contact 59 is also connected to one side of resistor 49. The other sides of resistors 48 and 49 are each connected to the cathode of diode rectifier 52, the anode of which is connected to one side of secondary 33 of transformer 31. Contact 60 is also connected to one side of resistor 50 and contact 61 is also connected to one side of resistor 51. The other sides of resistors 50 and 51 are each connected to the anode of diode rectifier 53. The cathode of rectifier 53 is connected to the high side of secondary winding 33 of transformer 31. The low side of secondary winding 53 is connected to ground. One side of primary winding 32 of transformer 31 is connected to variable contact 35 of Variac 34. A.-C. source 54 is connected across Variac 34. Transformer 31 is a commercially available type that supplies a high voltage at a low current.

The operation of the diode testing circuit of Fig. 2 is described as follows. In a manner similar to that shown in Fig. 1, secondaries 30 and 33 of transformers 28 and 31, respectively, are connected in phase so that the voltages on each secondary pass through their positive and negative cycles simultaneously and, hence, pass through zero at the same time. Phase shift network 55 is adjusted so that center contact 27 switches between contacts 58 and 59 on one side of the relay and contacts 60 and 61 on the other side of the relay when the voltage on the secondaries passes through zero. The polarities of secondary windings 30 and 33 and coil 57 of relay 56 are arranged so that, during the positive half of the voltage cycle, center contact 27 of the relay is connected to contacts 60 and 61. During the negative half of the voltage cycle, center contact 27 is connected to contacts 58 and 59. When center contact 27 is connected to contacts 60 and 61, a low positive voltage from transformer 28 is applied across diodes 38 and 39. The current through the diodes is adjusted by means of variable resistors 42 and 43, respectively. Resistors 46 and 47 operate as current-sensing devices, and a voltmeter can be connected across each of these resistors. If the values of these resistors are accurately fixed, the voltmeter may be calibrated directly in terms of the current through 46 and 47 and, hence, through diodes 38 and 39.

At the same time that a small positive voltage is applied to diodes 38 and 39, a large positive, or reverse, voltage is applied to the cathode of diodes 36 and 37 from secondary 33 of transformer 31. This voltage is applied through diode 52 and resistors 48 and 49, respectively. Resistors 48 and 49 are used as current limiting resistors to protect transformer 31 in case diodes 36 or 37 fail.

When the voltages at secondaries 30 and 33 pass through zero, the center contact of relay 56 switches to contacts 58 and 59. Under this condition, the conditions with respect to diode pair 38 and 39 and diode pair 36 and 37 are reversed, and a low voltage is supplied to diodes 36 and 37 so as to cause conduction, and a high negative, or reverse, voltage is applied to diodes 38 and 39. Under these conditions resistors 50 and 51 act as current-limiting resistors in the circuits of diodes 39 and 38, respectively. Variable resistors 40 and 41 are similarly used to adjust the current in the forward direction for diodes 36 and 37. The reverse voltage is adjusted by means of Variac 34.

The circuit configurations shown in Figs. 1 and 2 provide a power dissipation in variable resistances 13, 40, 41, 42 and 43 of the same order of magnitude as the power dissipation in the diodes. In comparison to previous diode testing systems, for instance, the wasted power dissipated in the various resistances is reduced by a much as 98 percent. The circuits shown in the figures can be extended to the testing of large numbers of diodes. The number of diodes depends on the number of contacts available at the relay. In addition, a large number of relays may be used and supplied from the same A.-C. source.

The circuits in Figs. 1 and 2 do not necessarily represent the only configurations that can be used. The relays used may be of any type that can be used dependably with the A.-C. source that is available. It has been found that, for a 60-cycle source, a mercury wetted relay is dependable and capable of handling the currents involved. The phase shift network can be of any conventional type such as a resistance-condenser network. In Fig. 2 the diodes 52 and 53 can be eliminated. They are present principally to prevent the negative, or reverse, voltage from contributing to the current from the diodes during the forward conducting cycle. Current limiting resistance 48, 49, 50 and 51 are merely safety devices to prevent damage to the transformers in case the diodes are defective. Other configurations utilizing the principles of the invention may be devised by those skilled in the art without destroying the scope of the invention. The circuits may be used to alternately supply voltages to loads other than diodes. Hence, the invention is not to be limited by the embodiments specifically shown in the figures and described herein except as defined by the appended claims.

What is claimed is:

1. A switching circuit including, in combination, a source of alternating excitation; a first supply means connected to said source for providing a first output voltage having alternating positive and negative half cycles; a second supply means connected to said source for providing a second output voltage having positive and negative half cycles in phase with said first output voltage; a load; switching means connected to said source of alternating excitation for alternately connecting said load to said first and to said second supply means; means for adjusting the excitation to said switching means, whereby said load is connected to said first supply means during said positive half cycles and said load is connected to said second supply means during said negative half cycles.

2. A switching circuit including, in combination, a source of alternating excitation; a first supply means connected to said source for providing a first output voltage having alternating positive and negative half cycles; a second supply means connected to said source for providing a second output voltage having positive and negative half cycles in phase with said first output voltage; a plurality of loads; switching means connected to said source of alternating excitation for alternately connecting said plurality of loads to said first and to said second supply means; means for adjusting the excitation to said switching means, whereby said plurality of loads is connected to said first supply means during said positive half cycles and said plurality of loads is connected to said second supply means during said negative half cycles.

3. A switching circuit including, in combination, a source of alternating excitation; a first supply means connected to said source for providing a first output voltage having alternating positive and negative half cycles; a second supply means connected to said source for providing a second output voltage having alternating positive and negative half cycles in phase with said first output voltage; a load; relay means comprising a coil connected to said source of alternating excitation for alternately connecting said load to said first and to said second supply means; means for adjusting the phase of said excitation to said coil, whereby said load is connected to said first supply means during said positive half cycles and said load is connected to said second supply means during said negative half cycles.

4. A switching circuit including, in combination, a source of alternating excitation; a first supply means connected to said source for providing a first output voltage having alternating positive and negative half cycles; a second supply means connected to said source for providing a second output voltage having alternating positive and negative half cycles in phase with said first output voltage; a plurality of loads; relay means comprising a coil connected to said source of alternating excitation for alternately connecting said plurality of loads to said first and to said second supply means; means for adjusting the phase of said excitation to said coil, whereby said plurality of loads is connected to said first supply means during said positive half cycles and said plurality of loads is connected to said second supply means during said negative half cycles.

5. A switching circuit including, in combination, a source of alternating excitation; a first supply means connected to said source for providing a first output voltage having alternating positive and negative half cycles; a second supply means connected to said source for providing a second output voltage having alternating positive and negative half cycles in phase with said first output voltage; diode rectifier; relay means comprising a coil connected to said source of alternating excitation for alternately connecting said diode rectifier to said first and to said first and to said second supply means; means for adjusting the phase of said excitation to said coil, whereby said diode rectifier is connected to said first supply means during said positive half cycles and said diode rectifier is connected to said second supply means during said negative half cycles.

6. A switching circuit including, in combination, a source of alternating excitation; a first supply means connected to said source for providing a first output voltage having alternating positive and negative half cycles; a second supply means connected to said source for providing a second output voltage having alternating positive and negative half cycles in phase with said first output voltage; relay means comprising a coil connected to said excitation source, a pair of output contacts, one of said pair being connected to said first supply means and the other of said pair being connected to said second supply means, and a center contact connected to a load; and means connected to said coil for adjusting the phase of said alternating excitation to said coil, whereby said center contact is alternately connected to said one of said pair of output contacts during said positive half cycles and to said other of said pair of output contacts during said negative half cycles.

7. A switching circuit including, in combination, a source of alternating excitation; a first supply means connected to said source for providing a high output voltage at a low current having alternating positive and negative half cycles; a second supply means connected to said source for providing a low output voltage at a high current having alternating positive and negative half cycles, said low output voltage being in phase with said high output voltage; relay means comprising a coil connected to said source, a pair of output contacts, one of said pair being connected to said first supply means and the other of said pair being connected to said second supply means, and a center contact connected to a load; means for adjusting the phase of said input alternating excitation to said coil, whereby said center contact is connected to one of said pair of output contacts during said positive half cycle and to the other of said pair of output contacts during said negative half cycles; means for adjusting the value of said high current being supplied from said second supply means; and means for adjusting the value of said high voltage being supplied from said first supply means.

8. A switching circuit including, in combination, a source of alternating excitation; a relay comprising a coil connected to said source, a pair of output contacts, and a center contact; a first supply means for supplying a first voltage having alternating positive and negative half cycles comprising a high-voltage low-current transformer, a Variac connected between said source and the primary of said high-voltage low-current transformer for adjusting the value of said first voltage, the secondary of said high-voltage low-current transformer being connected to one of said pair of output contacts of said relay; a second supply means for supplying a second voltage having alternating positive and negative half cycles substantially in phase with said first voltage comprising a low-voltage high-current transformer, the secondary of said low-voltage high-current transformer being connected to the other of said output contacts of said relay and the primary of said low-voltage high-current transformer being connected to said source; a load connected to said center contact of said relay; means connected in series with said secondary of said low-voltage high-current transformer for adjusting the value of the current through said secondary of said low-voltage high-current transformer; means connected to said coil of said relay for adujsting the phase of the alternating excitation on said coil, whereby said center contact is connected to one of said pair of output contacts during said positive half cycles of said first and second voltages and to the other of said contacts during said negative half cycles.

9. A switching circuit including, in combination, a source of alternating excitation; a first supply means connected to said source for providing a first output voltage having alternating positive and negative half cycles; a second supply means connected to said source for providing a second output voltage having alternating positive and negative half cycles in phase with said first output voltage; a plurality of loads; relay means comprising a coil connected to said excitation source, a plurality of output contacts, a first quantity of said output contacts connected to a first group of said loads, a second quantity of output contacts connected to a second group of said loads, and a center contact connected to said second supply means; a plurality of impedance means connected between said first supply means and said output contacts; means connected to said coil for adjusting the phase of said alternating excitation to said coil, whereby said center contact is alternately connected to said first quantity of output contacts during said positive half cycles and to said second quantity of output contacts during said negative half cycles.

10. A switching circuit including, in combination, a source of alternating excitation; a first supply means connected to said source for providing a first output voltage having alternating positive and negative half cycles; a second supply means connected to said source for providing a second output voltage having alternating positive and negative half cycles in phase with said first output voltage; a plurality of diode rectifiers; relay means comprising a coil connected to said excitation source, a plurality of output contacts, a first quantity of said output contacts connected to a first group of said diode rectifiers, a second quantity of output contacts connected to a second group of said diode rectifiers, and a center contact connected to said second supply means; a plurality of impedance means connected between said first supply means and said output contacts; means connected to said coil for adjusting the phase of said alternating excitation to such coil, whereby said center contact is alternately connected to said first quantity of output contacts during said positive half cycles and to said second quantity of output contacts during said negative half cycles.

11. A relay switching circuit including, in combination, a source of alternating excitation; a first supply means connected to said source for providing a high output voltage at a low current having alternating positive and negative half cycles; a second supply means connected to said source for providing a low output voltage at a high current having alternating positive and negative half cycles in phase with said first output voltage; a plurality of diode rectifiers; relay means comprising a coil connected to said excitation source, a plurality of output contacts; a first quantity of said output contacts connected to a first group of said diode rectifiers, a second quantity of output contacts connected to a second group of said diode rectifiers, and a center contact connected to said second supply means; a plurality of impedance means connected between said first supply means and said output contacts; means connected to said coil for adjusting the phase of said alternating excitation to such coil whereby said center contact is alternately connected to said first quantity of output contacts during the said positive malf cycles and to said second quantity of output contacts during said negative half cycles; beans for adjusting the value of said high curent being supplied from said second supply means; and means for adjusting the value of said high voltage from said first supply means.

No references cited.